United States Patent
Illingworth

(12) 
(10) Patent No.: US 6,896,104 B2
(45) Date of Patent: May 24, 2005

(54) FLAT SPOOL ELASTIC MOTOR HAVING TIME-AVERAGED CONSTANT TORQUE OUTPUT

(75) Inventor: Lewis Illingworth, Kensington, NH (US)

(73) Assignee: Vortex HC, LLC, Englewood, NJ (US)

( * ) Notice: Subject to any disclaimer, the term of this patent is extended or adjusted under 35 U.S.C. 154(b) by 0 days.

(21) Appl. No.: 09/808,634

(22) Filed: Mar. 14, 2001

(65) Prior Publication Data

US 2001/0050201 A1 Dec. 13, 2001

Related U.S. Application Data

(63) Continuation-in-part of application No. 09/578,419, filed on May 25, 2000.

(51) Int. Cl.[7] .................................................. F03G 1/00
(52) U.S. Cl. ............................................ 185/37; 185/39
(58) Field of Search ............................... 185/9, 10, 37, 185/39, 45

(56) References Cited

U.S. PATENT DOCUMENTS

| 1,820,967 A | * | 9/1931 | Enyeart | 185/37 |
| 3,308,907 A | * | 3/1967 | Bodkin | 185/39 |

FOREIGN PATENT DOCUMENTS

| JP | 1-288657 | * 11/1989 |

* cited by examiner

Primary Examiner—William C. Joyce
(74) Attorney, Agent, or Firm—Ward & Olivo

(57) ABSTRACT

An improved elastic motor is disclosed having a constant torque characteristic. The motor utilizes a reel with elastic stretched to its maximum tension. Each unit length of the elastic is allowed to relax back to its normal state while generating work in a process that will continue until the wheel is fully unwound. The present invention will ease design of mobile devices and the like by providing a power source having a predictable and stable output characteristic.

19 Claims, 7 Drawing Sheets

FLAT SPOOL ELASTIC MOTOR HAVING TIME-AVERAGED CONSTANT TORQUE OUTPUT

CROSS REFERENCE TO OTHER APPLICATIONS

This application is filed as a continuation-in-part of co-pending application Ser. No. 09/578,419 entitled "Elastic Motor" filed May 25, 2000.

FIELD OF THE INVENTION

This invention relates generally to elastic motors, and more specifically, to an improved elastic motor having constant torque characteristics.

BACKGROUND OF THE INVENTION

Elastic motors have been employed for centuries and have found particular application in model airplanes for over 150 years. Typical prior art elastic motors, such as those used in a model airplane, generally comprise a rubber loop threaded through a hook on a propeller shaft and is further attached to another hook at the tail of the craft. As the motor is wound up it first twists the elastic into a skein, then a row of knots form and spread along the whole length. A third stage occurs when a row of knots forms in the already knotted skein. When this row is complete the rubber is substantially stretched to its limit.

Upon release of propeller, there is a burst of power. When this is spent, a period of slowly declining torque follows for the majority of the motor run and is followed by a decline to zero torque.

The torque characteristics of the prior art elastic motor devices, like those described above, make model airplane design a considerable challenge. Clearly, this is because it is difficult for a designer to properly construct design constraints when the source of propulsion has such wavering torque characteristics. Aside from model airplane design, conventional elastic motors have undesirable performance in other applications as well. The knotting of the rubber introduces internal friction in the wound skein that can be eased somewhat by lubrication. Lubrication, however, drastically reduces the useful life of the rubber.

Therefore, the shortcomings of the prior art suggest a strong need for an elastic motor design that has a constant torque characteristic and does not damage the elastic material.

One particular invention which aims to answer this need for a constant torque producing elastic motors is disclosed in McAneny U.S. Pat. No. 4,629,438 which describes a rubber band powered motor for a model airplane. McAneny teaches a method of providing an extended flight by producing a more stable torque. The elastomeric members are either fully stretched, fully relaxed, in brief stretching mode or in brief relaxing mode. As a result, McAneny relies on tapes and gears, coupled to multiple elastomeric members, to absorb the sudden bursts and function to produce a more stable torque output. Additionally, McAneny relies upon components, namely gears and tapes, which may add significant weight, cost and size to the design, all of which are undesirable characteristics for most applications.

Thus, there exists a need for an elastic motor which can provide an approximately constant torque output while still retaining desirable and practical characteristics such as light weight, low cost and small size.

SUMMARY OF THE INVENTION

The present invention is directed towards an elastic motor, more specifically, to an elastic motor having a constant torque characteristic.

The motor system of an embodiment of the present invention starts with a reel which is wound with elastic stretched to its maximum tension. Each unit length of the elastic is allowed to relax back to its normal state while generating torque in a process that continues until the reel is fully unwound. The process may be seen as analogous to a steam engine which has a supply of steam at constant pressure. Portions of steam are fed to a cylinder where they expand to generate work (pressure times change in volume) by pushing a cylinder back to turn a wheel. When the expansion is complete the steam is exhausted and the process repeated. In the case of the present invention, a unit length of stretched elastic is connected into a system and allowed to contract to its unstressed state while turning a wheel and developing work. When fully contracted the relaxed elastic is fed to a take up reel and a new unit length of stretched elastic is taken. The process is continued until all the stretched elastic is used up. There is no twisting or knotting of the elastic and no need to lubricate it to prevent binding and wear as in a twisted skein, although some lubrication may assist operation.

Additionally, similar results can be obtained through the use of more than one spool, wherein each spool has a corresponding elastic member of which its transition from a tense state to a relaxed state represents one torque period, and all torque periods collectively yielding an approximate torque output. In such an embodiment, sensing means may allow for the spools to release the tension of their corresponding elastic members in series whereupon each new torque period begins when the previous spool reaches a certain level of low tension.

Furthermore, certain applications may be enhanced through the use of an elastic motor of the present invention with a minimum number of moving parts. Such a design may comprise the continuous transfer of an elastic member between two spools. This concept may be realized through the inclusion of a flat drive spool whereupon an elastic member is stretched and releases tension upon each rotation in a periodic fashion. Pinch rollers may be included to yield a desired tension in the elastic member as the portions of the elastic member that have released tension are left slack beyond the pinch rollers. Optionally, a take up spool may be included in addition to, or in place of, pinch rollers.

Hence, it is an object of the invention to provide an improved elastic motor.

Furthermore, it is an object of the invention to provide an improved elastic motor having a constant torque characteristic.

Further, it is an object of the invention to provide an improved means of powering portable devices.

Additionally, it is an object of the invention to provide an elastic motor having increased elastic material life.

Further, it is an object of the invention to provide an improved means of driving a dynamo.

Furthermore, it is an object of the invention to provide an improved means of powering wind-up toys and devices.

These and other objects will become apparent to those skilled in the art upon study of the following drawings and detailed description.

BRIEF DESCRIPTION OF THE DRAWINGS

A further understanding of the present invention can be obtained by reference to a preferred embodiment set forth in the illustrations of the accompanying drawings. Although the illustrated embodiment is merely exemplary of systems for carrying out the present invention, both the organization and method of operation of the invention, in general, together with further objectives and advantages thereof, may be more easily understood by reference to the drawings and the following description. The drawings are not intended to limit the scope of this invention, which is set forth with particularity in the claims as appended or as subsequently amended, but merely to clarify and exemplify the invention.

For a more complete understanding of the present invention, reference is now made to the following drawings in which.

DETAILED DESCRIPTION OF THE INVENTION

As required, a detailed illustrative embodiment of the present invention is disclosed herein. However, techniques, systems and operating structures in accordance with the present invention may be embodied in a wide variety of forms and modes, some of which may be quite different from those in the disclosed embodiment. Consequently, the specific structural and functional details disclosed herein are merely representative, yet in that regard, they are deemed to afford the best embodiment for purposes of disclosure and to provide a basis for the claims herein which define the scope of the present invention. The following presents a detailed description of a preferred embodiment (as well as some alternative embodiments) of the present invention.

Certain terminology will be used in the following description for convenience in reference only and will not be limiting. The words "in" and "out" will refer to directions toward and away from, respectively, the geometric center of the device and designated and/or reference parts thereof. The words "up" and "down" will indicate directions relative to the horizontal and as depicted in the various figures. The words "clockwise" and "counterclockwise" will indicate rotation relative to a standard "right-handed" coordinate system. Such terminology will include the words above specifically mentioned, derivatives thereof and words of similar import.

Figure 1:
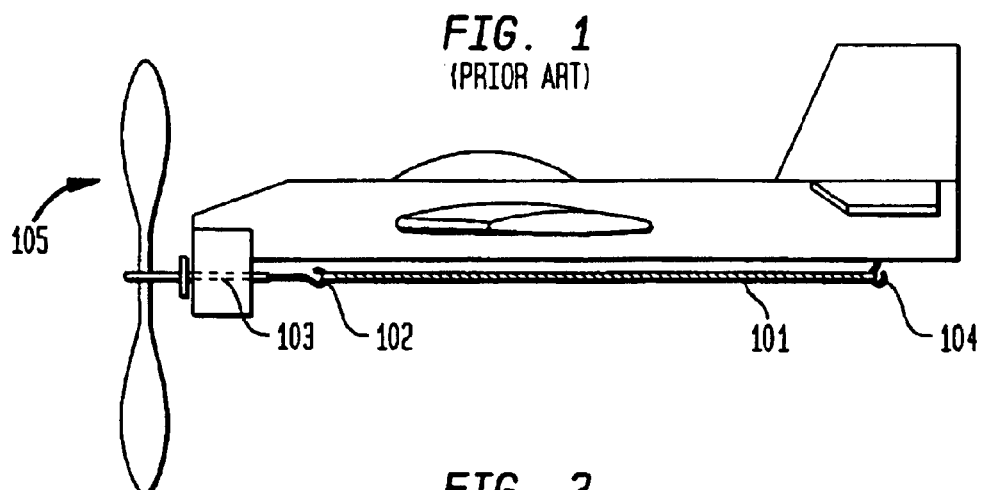
FIG. 1 (FIG. 1) depicts an elastic motor typical of the prior art.

Referring first to FIG. 1, depicted is a typical prior art elastic motor in a model airplane. A rubber loop 101 is threaded through a hook 102 on the propeller shaft 103 and is attached to another hook 104 at the tail. As the motor is wound up it first twists into a skein, then a row of knots form and spread along the whole length. A third stage occurs when a row of knots forms in the already knotted skein. When this row is complete the rubber is generally stretched to its limit.

Figure 2:
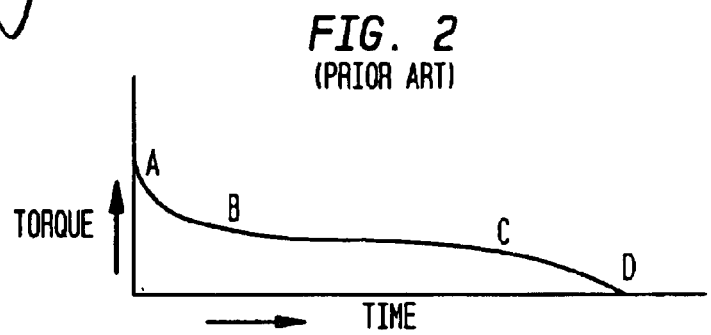
FIG. 2 (FIG. 2) depicts the torque characteristics of an elastic motor typical of the prior art.

Upon release of propeller 105 there is a burst of power, A to B as depicted on the torque characteristic of FIG. 2. When this is spent, a period of slowly declining torque B to C follows for the majority of the motor run and is followed by a decline to zero torque, points C to D.

Figure 3A:
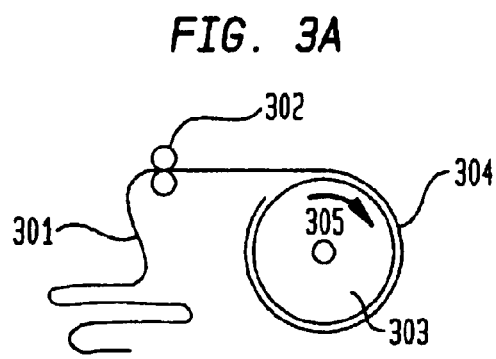
FIG. 3A (FIG. 3A) depicts an elastic motor, in accordance with the present invention, in wind up mode.

FIG. 3A through 3D show a first embodiment of the present invention. FIG. 3A shows an elastic motor in accordance with the present invention in wind up mode. Fully relaxed elastic 301 passes through movable rollers 302 as reel 303 rotates in a clockwise direction 305. The elastic 304 is wound at constant tension and is fully stretched.

Figure 3B:
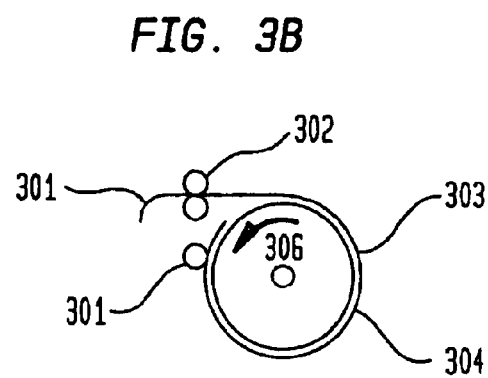
FIG. 3B (FIG. 3B) depicts an elastic motor, in accordance with the present invention, in the start of operating mode.

In FIG. 3B, an elastic motor in accordance with the present invention at the start of operating mode is depicted. Movable rollers 302 grab the elastic 301 close to the reel 303. Bar 307 is coupled to the reel 303 and is used to prevent slip of the stretched elastic 304. The length of the elastic between 307 and 302 is NL where L is a unit length of relaxed elastic. The operation cycle allows this to be relaxed back to its relaxed length L while the tension in the elastic provides torque to turn reel 303 and supply power to a load. Reel 303, upon release, will begin to rotate in a counterclockwise direction 306.

Figure 3C:
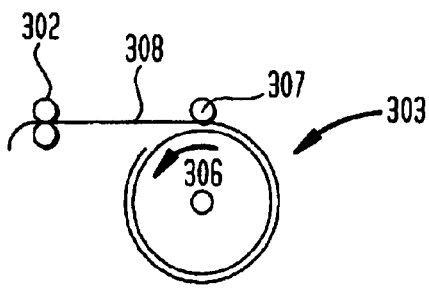
FIG. 3C (FIG. 3C) depicts an elastic motor, in accordance with the present invention, at the end of the first cycle of operation.

FIG. 3C depicts an elastic motor in accordance with the present invention at the end of the first operating cycle. Reel 303 is allowed to release, causing counterclockwise rotation 306. The length between rollers 302 and bar 307 shortens to unit length L as the tension in the elastic 308 decreases until complete relaxation.

Figure 3D:
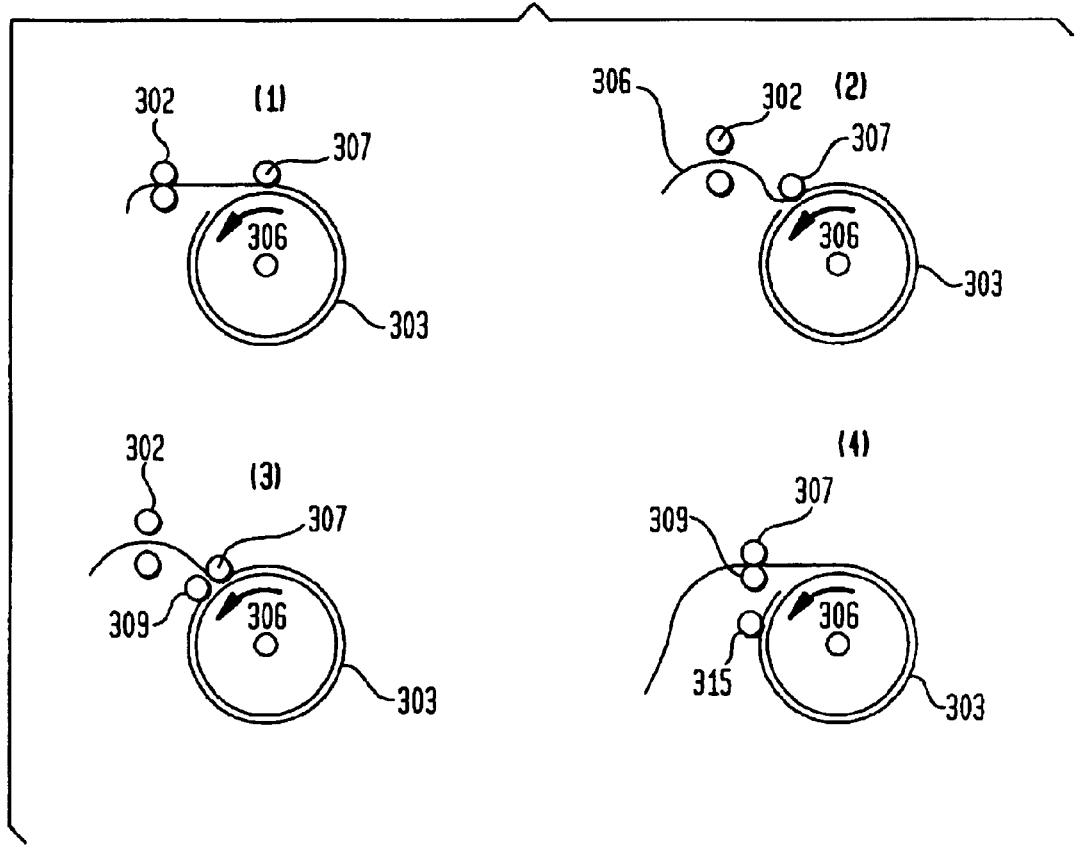
FIG. 3D (FIG. 3D) depicts the behavior of the elastic material in an elastic motor in accordance with the present invention.

FIG. 3D depicts an elastic motor in accordance with the present invention that is capable of multiple operating cycles. This is accomplished by introducing an additional bar 309 and disengaging bar 307. In FIG. 3D(1), the elastic motor is shown at the end of the first operating cycle, as described above in FIG. 3C. In FIG. 3D(2), rollers 302 are first backed up and the elastic 308 is released. Bar 307 remains engaged to maintain secure contact between elastic 308 and reel 303. Reel 303 continues to rotate in counterclockwise direction 306. In FIG. 3D(3) the changeover point between cycles is shown. While the elastic remains released between reels 302, additional bar 309 is introduced between bar 307 and elastic 308. Reel 303 is poised to continue rotation in counterclockwise direction 306. In FIG. 3D(4) the start of the second cycle is shown. Pinch rollers 307 and 309 are moved to position 302 and new clamping bar 315 is placed in the initial position of 307 as in FIG. 3B. Clamping rollers 307 and 309 are opened and elastic 308 is released. This cycle is identical to the start of the first operating cycle described in FIG. 3B, with bar 307 replaced with bar 315. Reel 303 is now ready to continue rotating in counterclockwise direction 306 until bar 315 approaches clamping rollers 307 and 309 in position 302. At that point, the cycle repeats with bar 315 in position of 307 of FIG. 3D(1). The pinch rollers 302 and clamping bars 307, 315 and 309 recycle their functions with each ensuing cycle.

Figure 3E:
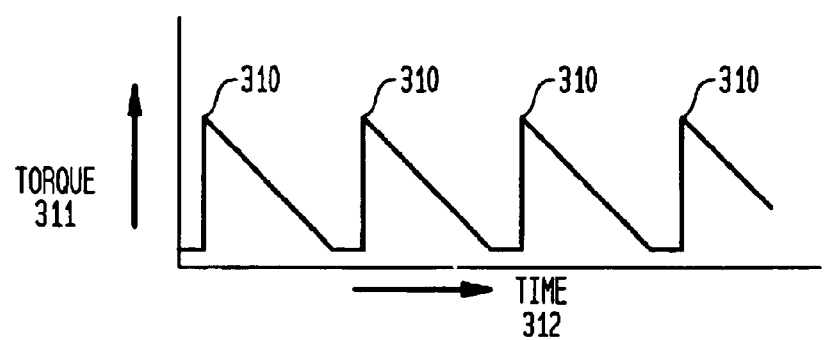
FIG. 3E (FIG. 3E) depicts the torque characteristics of an elastic motor in accordance with the present invention.

FIG. 3E depicts the output torque characteristics of the elastic motor just described. Torque is plotted on axis 311 versus time on axis 312. Peak values 310 are equal to the elastic tension multiplied by the reel radius. The average output torque is half that amount and is constant throughout operation.

Figure 4A:
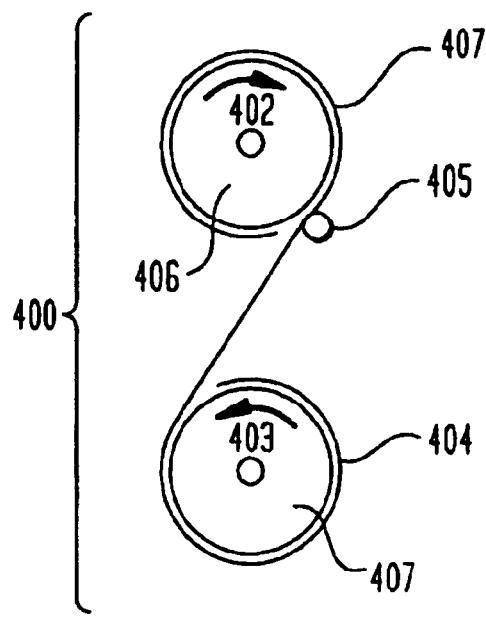
FIG. 4A (FIG. 4A) depicts an alternate embodiment of an elastic motor in accordance with the present invention.

Another embodiment of the present invention comprises two reels, one for relaxed elastic, the other for stretched elastic. The two reels may be the same size, but it is not necessary. Differing diameters or geometries can provide different output characteristics. FIG. 4A depicts an exemplary motor 400 in accordance with this embodiment of the present invention. Motor 400 is shown in wind up mode. Reel 406 is loaded with relaxed rubber 401, the end of which is connected to opposing reel 407. Reel 406 rotates in a clockwise direction 402 and reel 407 rotates in counterclockwise direction 403. The elastic 404 wound on reel 407 is stretched to n times its lengthened, and optimally, is at full tension. Thus reel 407 turns n times as fast as reel 406. Roller 405 prevents the elastic 401 on reel 406 from slipping over itself and ruining the tension relationship.

Figure 4B:
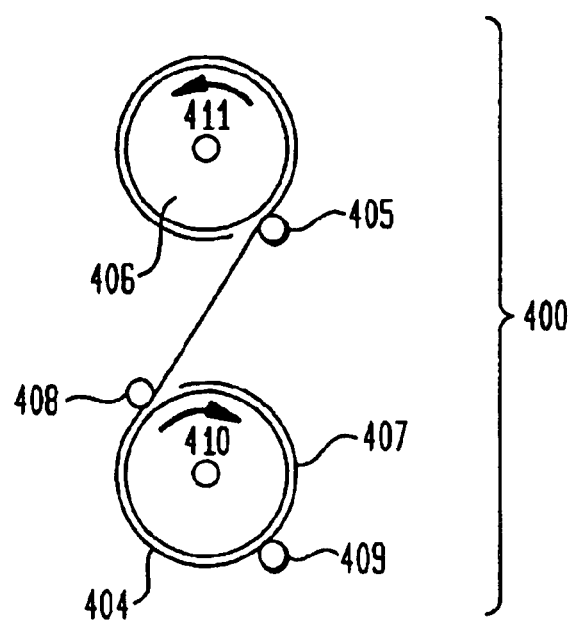
FIG. 4B (FIG. 4B) depicts an alternate embodiment of an elastic motor in accordance with the present invention, in operational mode.

FIG. 4B depicts the motor 400 in operational mode, wherein the device is producing work. Reel 407 has two bars 408 and 409 pressing against the elastic 404 to prevent slippage. Reel 407 rotates in clockwise direction 410 taking bars 408 and 409 with it. Opposing reel 406 rotates in counterclockwise direction 411. When bar 408 approaches roller 405, the elastic 404 between bar 408 and roller 405 is in its relaxed state. At this point, roller 405 is disengaged to allow bar 408 to pass and further allow elastic 404 to wind onto reel 406. After bar 408 passes, roller 405 is put back in place. Bar 408 is now removed and the elastic 404 between bar 407 and roller 405 undergoes the same process. At this point, bar 408 is replaced and is ready for the next cycle. Motor 400 is capable of multiple operating cycles.

Figure 5A:
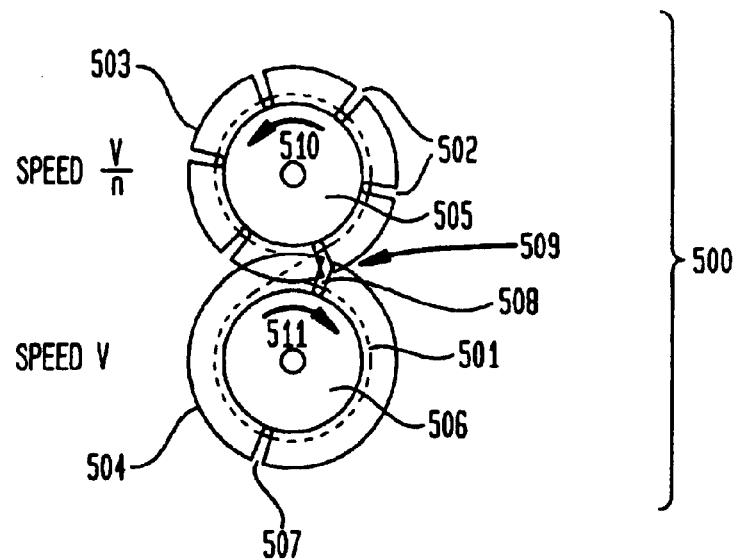
FIG. 5A (FIG. 5A) depicts an alternate embodiment of an elastic motor in accordance with the present invention utilizing crossbars in the elastic.

Such a device 400 as described can achieve the required operation, however, the need to remove and replace bars 408 and 409 and roller 405 complicates operation. Thus, an alternate embodiment is depicted in FIG. 5A. An elastic sheet 501 is used comprising integral crossbars that engage in slots 502, 507 and 508 on reel end plates 503 and 504 to maintain the high and low tension zones in the elastic 501 and allow automatic transfer between the two reels 505 and 506 without the need for any other moving parts. The two reels 505 and 506 are fitted with slotted end plates 503 and 504. Reel 505 rotates in counterclockwise direction 510 n times as fast as reel 506 rotates in clockwise direction 511. Reel 506 has two slots 507 and 508 in its end plates. Reel 505 has 2n slots 502 in its end plates 503. The end plates 503 and 504 overlap at point 509 so that the elastic 501 can transfer between the reels 505 and 506 without any slipping and thus maintain the tension relationship. Rotating reel 506 counterclockwise will automatically stretch the elastic 501 to n times its original length. The two reels 505 and 506 could be coupled together by a gear box or a cog belt to have an n to 1 speed ratio and assist in maintaining accurate alignment. Coupling the two reels 505 and 506 together reduces the output torque to $[1-(1/n)]$ of the maximum. Thus, the higher the value of n, the higher the system efficiency.

Figure 5B:
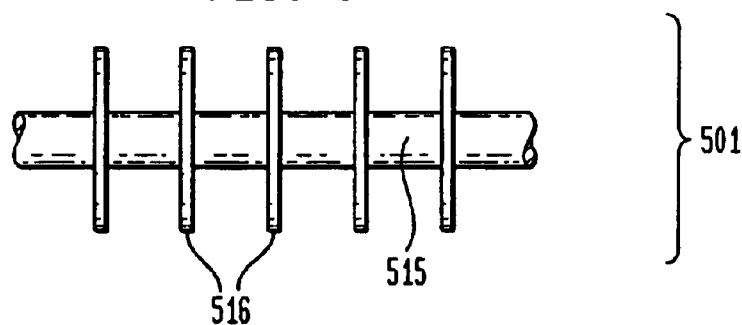
FIG. 5B (FIG. 5B) depicts a detail of the elastic used in the device of FIG. 5A.

FIG. 5B depicts a detail of the elastic used in device 500. Elastic 501 comprises an elastic strip 515 and integral crossbars 516. Crossbars 516 articulate with slots 502, 507 and 508 to constrain the movement of reels 505 and 506 and thus maintain the tension relationship.

Figure 6:
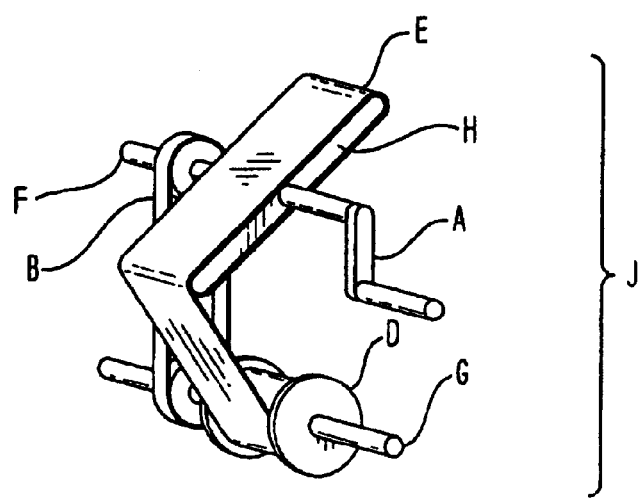
FIG. 6 (FIG. 6) depicts an embodiment of a flat drive spooled elastic motor of the present invention.
Figure 7A:
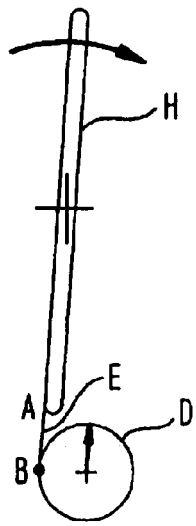
FIG. 7 (FIG. 7) depicts a sequence of an elastic motor of the present invention in a wind up process.
Figure 7B:
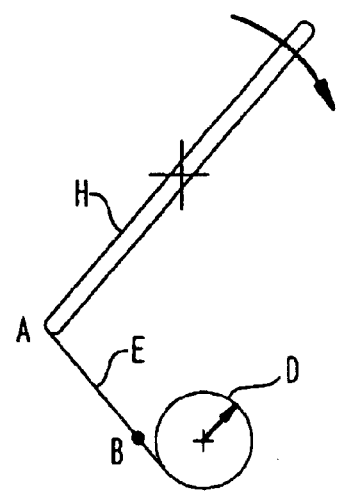
Figure 7C:
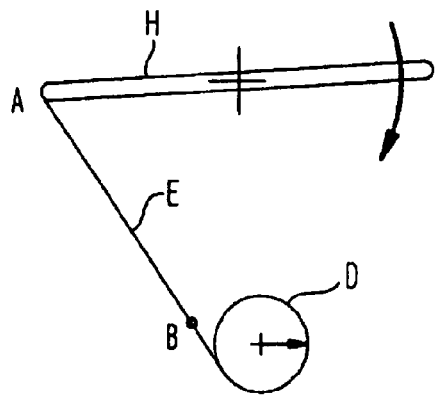
Figure 7D:
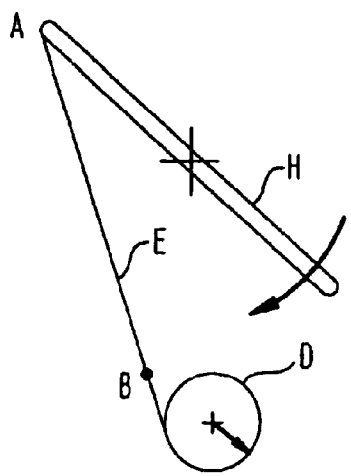
Figure 7E:
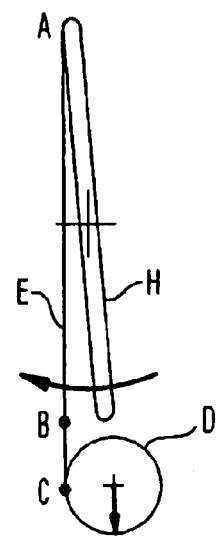
Figure 8A:
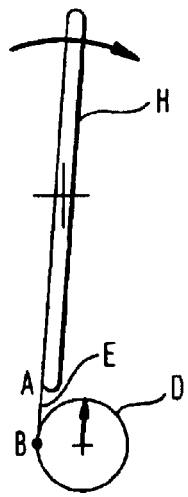
FIG. 8 (FIG. 8) depicts a sequence of an elastic motor of the present invention in operation.
Figure 8B:
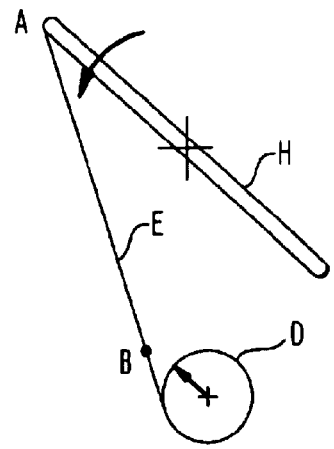
Figure 8C:
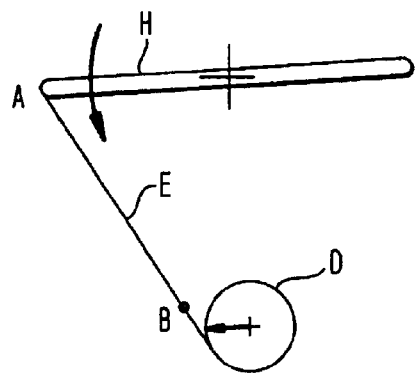
Figure 8D:
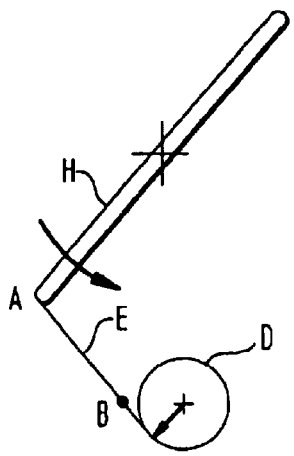
Figure 8E:
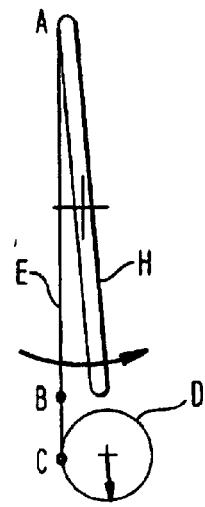

Referring next to FIG. 6, depicted is an embodiment of an elastic motor of the present invention with a flat drive spool H. This elastic motor J operates with one end of elastic member E attached to flat drive spool H and the other end of elastic member E attached to take up spool D. To initiate tension in elastic member E, winding sequence begins by winding crank A clockwise. Winding crank A is coupled to flat drive spool H to yield elastic member being tightly wound around flat drive spool H. Upon completion of the wind up sequence winding crank A may be removed. As shown, take up spool D is coupled to take up shaft G and functions to collect relaxed elastic member E upon the release of tension in elastic member E. Also, flat drive spool H is coupled to drive shaft F, which is further coupled to take up shaft G, and thus take up spool D, by means of coupling belt B. This configuration results in flat drive spool H operating complementary with take up spool D, whereupon take up spool D turns counterclockwise to collect elastic member E as a counterclockwise rotation of flat drive spool H occurs during the operating period of the elastic motor. Likewise, upon flat drive spool H rotating clockwise during wind up sequence, take up spool D turns clockwise as it releases elastic member E. Drive shaft F provides a torque output during operation.

While elastic motor J may successfully operate with all features described above, without certain modifications this design is prone to slippage of elastic member E around take up spool D. For example, if elastic member E on take up spool D tightens during operation it will not be fully relaxed for the next wind up sequence and would lead to overstretching and breakage of elastic member E upon additional wind up sequences. Thus, additional features are discussed in the following which will lead to proper functioning of elastic motor J throughout many cycles of use.

One important feature is to design the texture of elastic member E such that it will not interlock or slip upon the wind up sequence. The texture of elastic member E may take the form of transverse ribs, in that elastic member E will comprise ridges on one side, or it may have ridges on both sides. Additionally, the shape of take up spool D may be made flat, similar to drive spool H, so that elastic member E will bind on the ends of take up spool D rather than slip around the edges. Furthermore, elastic member E may pass through pinch rollers to better control the tension of elastic member E during wind up and operating sequences to provide for proper operation. An embodiment with such pinch rollers is detailed later in FIG. 9.

Referring next to FIG. 7, depicted is a sequence of an exemplary elastic motor of the present invention in a wind up process. As in FIG. 6, one end of elastic member E is attached to take up spool D and the other end of elastic member E is attached to an end of flat drive spool H. Elastic member E is initially wound up in its relaxed state around take up spool D. In FIG. 7A, elastic member E is attached to the end of drive spool H at point A and the initial position of the outermost portion of elastic member E still remaining on take up spool D is identified at point B. In FIG. 7B, elastic member E is stretched along one side of drive spool H as said drive spool H is rotated clockwise. As shown, the end of elastic member E connected at point A remains at the end of drive spool H as said elastic member E is stretched. FIG. 7C depicts the wind up sequence after flat drive spool H has been rotated approximately 90 degrees clockwise. Nearing a 180 degree rotation of flat drive spool H, FIG. 7D depicts the next step of the wind up process, in which distance A to B is less than the length of flat drive spool H. FIG. 7E then depicts the wind up sequence after flat drive spool H is rotated approximately 180 degrees clockwise. The length of stretched elastic member E from point A to point B extends approximately as long as the length of flat drive spool H. The wind up sequence then repeats with new starting point C at the outermost portion of elastic member E still remaining on take up spool D, and with point B of the elastic member E located at the other end of flat drive shaft H. The described winding procedure continues until all of elastic member E is transferred from take up spool D to flat drive spool H.

FIG. 8 depicts a sequence of an exemplary elastic motor of the present invention in operation. After the wind up sequence has been completed and flat drive spool H has been engaged to rotate counterclockwise, the tension in elastic member E begins to turn flat drive spool H clockwise. FIG. 8A depicts initial counterclockwise rotation of flat drive spool H. Next, FIG. 8B depicts a section of elastic member E being pulled off one side of flat drive spool H and transferred to take up spool D. FIG. 8C then depicts the operational sequence after flat drive spool H has rotated approximately 90 degrees counterclockwise. Next, FIG. 8D depicts the transferring of elastic member E from flat drive spool H to take up spool D, wherein the release of tension in elastic member E continues to rotate flat drive spool H counterclockwise. Finally, FIG. 8E depicts the beginning of the removal of another section of elastic member E from flat drive shaft H. The preceding operation sequence repeats until all of elastic member E is transferred from flat drive spool H to take up spool D.

Figure 9:
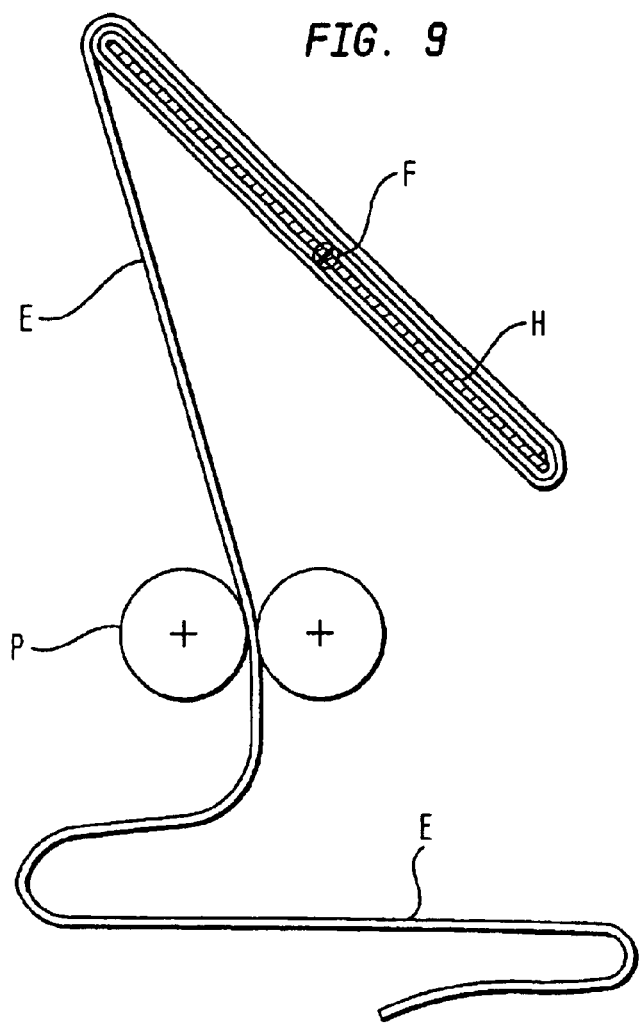
FIG. 9 (FIG. 9) depicts an embodiment of a flat drive spooled elastic motor of the present invention with pinch rollers.

FIG. 9 depicts an exemplary elastic motor with flat drive spool H and pinch rollers P. One end of elastic member E is attached to flat drive spool H and the end of elastic member E remains slack and may be attached to take up means (such as take up spool as in FIG. 6) or left unattached. Elastic member E is wound under tension around flat drive spool H. Pinch rollers P provide means for creating this tension by pinching elastic member E between them as flat drive spool H is wound. Pinch rollers may take the form of cog wheels that trap elastic member E between its teeth to prevent slippage. Furthermore, the cog wheels, or gear wheels may be made elliptical in order to vary the rate at which elastic member E is taken up during each revolution.

Figure 10:
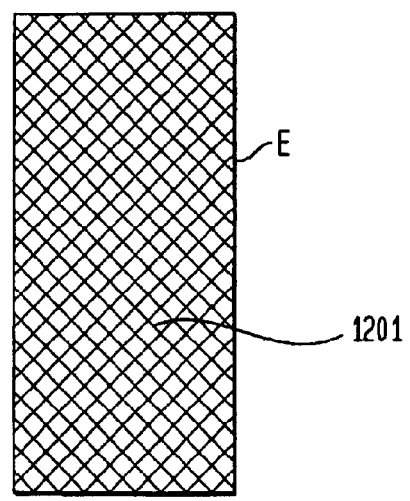
FIG. 10 (FIG. 10) depicts an elastic member with a surface pattern.

FIG. 10 depicts a textured surface 1201 upon elastic member E. By adding texture to elastic member E, slippage between the elastic member and the spools can be prevented. Textured surface 1201 may comprise any surface pattern which prevents slippage without departing from the scope of the present invention.

While the present invention has been described with reference to one or more preferred embodiments, such embodiments are merely exemplary and are not intended to be limiting or represent an exhaustive enumeration of all aspects of the invention. The scope of the invention, therefore, shall be defined solely by the following claims. Further, it will be apparent to those of skill in the art that numerous changes may be made in such details without departing from the spirit and the principles of the invention. It should be appreciated that the present invention is capable of being embodied in other forms without departing from its essential characteristics.

I claim:

1. A mechanical stored energy device comprising:
   a rotatable drive spool, said rotatable drive spool being oblong;
   a rotatable take-up spool;
   a member, said member being both flexible and stretchable, said member capable of being wound upon and attaching to said rotatable drive spool under tension and further capable of being wound upon said rotatable take-up spool under tension, wherein said tension stretches said member;
   a drive shaft for providing a torque, whereupon said rotatable drive spool is mounted; and
   a take-up shaft whereupon said rotatable take-up spool is mounted.

2. A mechanical stored energy device in accordance with claim 1, wherein said rotatable drive spool has rounded edges.

3. A mechanical stored energy device in accordance with claim 1, wherein said rotatable drive spool is rectangularly-shaped.

4. A mechanical stored energy device in accordance with claim 1, further comprising coupling means to rotationally couple said drive shaft and said take-up spool.

5. A mechanical stored energy device in accordance with claim 1, wherein said rotatable drive spool is coupled with a winding crank.

6. A mechanical stored energy device in accordance with claim 5, wherein said winding crank can be removed after winding of said member and before release of said tension in said member.

7. A mechanical stored energy device in accordance with claim 1, wherein said rotatable drive spool is flat-shaped with two rounded edges.

8. A mechanical stored energy device in accordance with claim 1, wherein said rotatable take-up spool is cylindrically-shaped.

9. A mechanical stored energy device in accordance with claim 1 further comprising guide members to assist the wind up of said member on said rotatable take-up spool.

10. A mechanical stored energy device in accordance with claim 4, wherein said coupling means comprises a coupling belt.

11. A mechanical stored energy device in accordance with claim 10, wherein said coupling belt is comprised of an elastomeric material.

12. A mechanical stored energy device in accordance with claim 1, wherein said member comprises a surface pattern to prevent slippage.

13. A mechanical stored energy device in accordance with claim 1, wherein said member is comprised of a material having a sufficient coefficient of friction to prevent slippage.

14. A mechanical stored energy device in accordance with claim 1, wherein said edges of said rotatable drive spool are comprised of a material having a sufficient coefficient of friction to prevent slippage.

15. A mechanical stored energy device in accordance with claim 1, wherein said rotatable drive spool and said rotatable take-up spool rotate at substantially the same speed.

16. A mechanical stored energy device in accordance with claim 1, wherein said rotatable drive spool and said rotatable take-up spool rotate at substantially different speeds.

17. A mechanical stored energy device in accordance with claim 1, wherein said member is stretched substantially five to six times its original length.

18. A mechanical stored energy device in accordance with claim 1, further comprising pinch rollers, said pinch rollers maintain pressure on said member wherein sections of said member are under tension on one side of said pinch rollers and sections of said member are relaxed on the opposite side of said pinch rollers.

19. A mechanical stored energy device in accordance with claim 18, wherein said rotatable take-up spool is removable.

* * * * *